United States Patent
Zhang et al.

(10) Patent No.: US 12,054,433 B2
(45) Date of Patent: Aug. 6, 2024

(54) SILICON TO SILICON CARBIDE CONVERSION FOR CERAMIC MATRIX COMPOSITE FABRICATION

(71) Applicant: General Atomics, San Diego, CA (US)

(72) Inventors: Jiping Zhang, San Diego, CA (US); Austin Travis, San Diego, CA (US); Jonas Opperman, San Diego, CA (US); George Jacobsen, San Diego, CA (US)

(73) Assignee: General Atomics, San Diego, CA (US)

( * ) Notice: Subject to any disclaimer, the term of this patent is extended or adjusted under 35 U.S.C. 154(b) by 569 days.

(21) Appl. No.: 17/018,921

(22) Filed: Sep. 11, 2020

(65) Prior Publication Data

US 2022/0081368 A1 Mar. 17, 2022

(51) Int. Cl.
*C04B 35/80* (2006.01)
*C04B 35/628* (2006.01)
(Continued)

(52) U.S. Cl.
CPC ........ *C04B 35/80* (2013.01); *C04B 35/62839* (2013.01); *C04B 35/62863* (2013.01);
(Continued)

(58) Field of Classification Search
CPC .............. C04B 35/80; C04B 35/62839; C04B 35/62863; C04B 35/62886; C04B 35/65; C04B 35/657; C04B 2235/3826; C04B 2235/5244; C04B 2235/5252; C04B 2235/5436; C04B 2235/5454; C04B 2235/616; C04B 2235/77;
(Continued)

(56) References Cited

U.S. PATENT DOCUMENTS

2002/0176990 A1  11/2002  Johnson
2013/0011654 A1*  1/2013  Han .................. C04B 35/62894
                                         427/189

FOREIGN PATENT DOCUMENTS

CN   108963203 A    12/2018
CN   109616630 A  *  4/2019  ........... C01B 32/182
CN   109616630 A     4/2019

OTHER PUBLICATIONS

Machine translation, CN 109616630 (Year: 2019).*
Shen ("Excess carbon in silicon carbide", Shen et al, Journal of Applied Physics 108, 123705 (2010), 5 pages, accessed online Sep. 8, 2023). (Year: 2010).*

(Continued)

*Primary Examiner* — Michael G Miller

(57) ABSTRACT

Disclosed are techniques and methods for producing silicon carbide and ceramic matrix composites from hydrocarbons. In one aspect, a method includes preforming a shape using silicon carbide fibers placed into a chamber, evacuating the chamber causing a silicon and polymer slurry to enter the chamber, and pressurizing the chamber causing the silicon and polymer slurry to permeate the silicon carbide fibers. The method includes heating the chamber to cause pyrolysis of the polymer and a hydrocarbon passed into the chamber into carbon and hydrogen gas. The carbon from the pyrolyzed polymer and hydrocarbon provide a coating of carbon on the silicon in the silicon and polymer slurry. The method includes heating the chamber to a higher temperature causing the silicon to melt and react with the carbon to form silicon carbide. The formed silicon carbide and the silicon carbide fibers form the ceramic matrix composite.

23 Claims, 10 Drawing Sheets

(51) Int. Cl.
  *C04B 35/65* (2006.01)
  *C04B 35/657* (2006.01)

(52) U.S. Cl.
  CPC ........ *C04B 35/62886* (2013.01); *C04B 35/65* (2013.01); *C04B 35/657* (2013.01); *C04B 2235/3826* (2013.01); *C04B 2235/5244* (2013.01); *C04B 2235/5252* (2013.01); *C04B 2235/5436* (2013.01); *C04B 2235/5454* (2013.01); *C04B 2235/616* (2013.01)

(58) Field of Classification Search
  CPC ........ C04B 35/62884; C04B 2235/428; C04B 2235/48; C04B 2235/614; C04B 35/573; C01P 2006/60; C01B 32/984
  See application file for complete search history.

(56) References Cited

OTHER PUBLICATIONS

International Search Report and Written Opinion for International Application No. PCT/US2021/028497, mailed Jul. 8, 2021 (18 pages).
Kim et al., "Effect of Carbon-coated Silicon/Graphite Composite Anode on the Electrochemical Properties," Bull. Korean Chem. Soc., 29(10): 1965-1968, 2008.
QPAC® 40 Technical Data Sheet, Empower Materials, available at https://empowermaterials.com/wp-content/uploads/2014/11/QPAC-40-Technical-Data-Sheet.pdf.
Kumari et al., "Nano silicon carbide: a new lithium-insertion anode material on the horizon", RSC Advances, pp. 15028-15034, 2013.

\* cited by examiner

SILICON TO SILICON CARBIDE CONVERSION FOR CERAMIC MATRIX COMPOSITE FABRICATION

TECHNICAL FIELD

This patent document relates to silicon carbide and ceramic matrix composite materials for various applications.

BACKGROUND

Silicon carbide is used in a wide variety of applications including automotive clutches, ceramic plates, bullet proof vests, light emitting diodes, semiconductor detectors, nuclear cladding, and many other applications. Various existing production methods for silicon carbide tend to be slow processes and require in some cases over a thousand hours to produce a silicon carbide item. New techniques are needed for producing silicon carbide and ceramic matrix composites more quickly to make silicon carbide a more viable material for industrial, scientific, and military use.

SUMMARY

This patent document discloses techniques and methods for producing silicon carbide and ceramic matrix composites from hydrocarbons.

In one aspect, a method is provided for producing a ceramic matrix composite and includes placing a silicon carbide preform in a chamber; evacuating the chamber using a vacuum to introduce a slurry mix of silicon particles and a polymer in the chamber to contact the silicon carbide preform; pressurizing the chamber causing the silicon particles and polymer slurry to permeate between the silicon carbide fibers of the silicon carbide preform; heating the chamber to a first elevated temperature causing pyrolysis of the polymer into carbon and hydrogen gas to densify silicon particles between the silicon carbide fibers of the silicon carbide preform; passing a hydrocarbon into the chamber, wherein the heated chamber causes pyrolysis of the hydrocarbon into carbon and hydrogen gas and to cause the carbon from the pyrolyzed polymer and the carbon from the pyrolyzed hydrocarbon to be coated on the silicon particles between the silicon carbide fibers of the silicon carbide preform; stopping the passing the hydrocarbon when a desired molar ratio of silicon:carbon is reached; and heating the chamber to a second higher elevated temperature causing the silicon particles to melt and to react with the carbon to form silicon carbide to cause the formed silicon carbide and the silicon carbide fibers to form a SiC ceramic matrix composite.

In another aspect, a method of producing carbon coated silicon particles for a silicon carbide composite is disclosed. The method includes passing a hydrocarbon into a chamber containing a silicon powder, heating the chamber to a first temperature causing pyrolysis of the hydrocarbon into carbon and hydrogen gas, wherein the carbon from the hydrocarbon provides a coating of carbon on the silicon powder, and stopping the passing the hydrocarbon when a molar ratio of silicon:carbon reaches 1:1.

In another aspect an apparatus for producing silicon carbide is disclosed. The apparatus includes a chamber structured to include a hollow interior, wherein silicon particles are in the hollow interior. The apparatus further includes a fluid supply system coupled to the chamber to controllably supply selected fluids including gases and/or liquids into the chamber, including a first fluid which can be decomposed into hydrogen and carbon. The apparatus includes a heating system coupled to the chamber to controllably determine a temperature on the interior of the chamber. The apparatus further includes a control system coupled to the fluid supply system to control supplying of the selected fluids into the chamber, wherein control system controls the fluid supply system to cause the first fluid to pass through the chamber thereby causing decomposition of the first fluid into a generated hydrogen gas and carbon which is deposited onto the silicon particles to produce carbon coated silicon particles.

The above and other aspects and their implementations are described in greater detail in the drawings, the description and the claims.

DETAILED DESCRIPTION

Techniques and processes for producing silicon carbide (SiC) are disclosed.

Figure 1A:
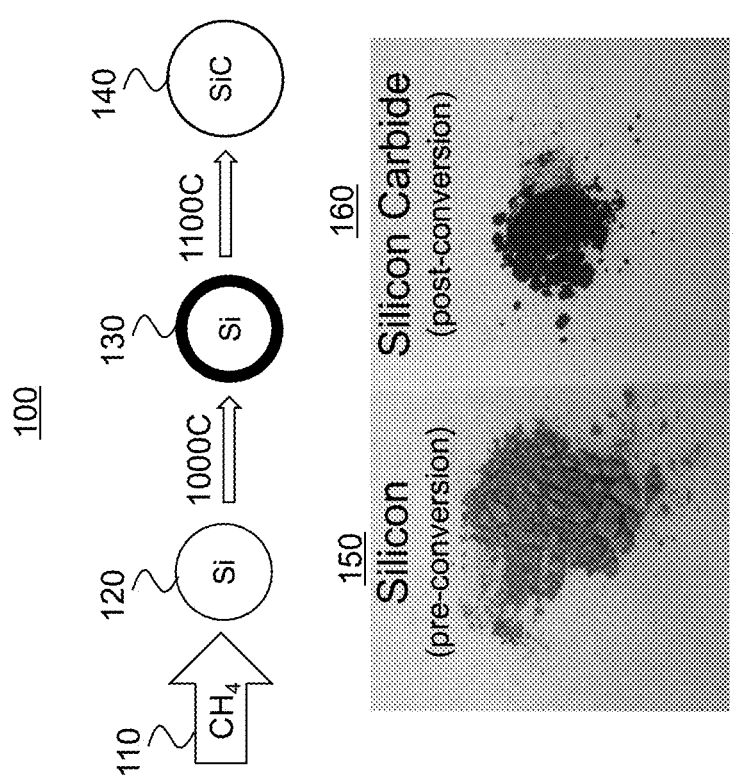
FIG. 1A depicts a process for converting silicon (Si) powder to silicon carbide (SiC) powder, in accordance with some example embodiments.

FIG. 1A depicts an example of a process 100 for converting silicon (Si) powder particles 120 to SiC powder particles 140, in accordance with some example embodiments. In FIG. 1A, Si powder is exposed to methane ($CH_4$) at an elevated temperature to cause carbon from decomposed methane to be coated on the Si powder particle surface, e.g., at about 1000° C. The silicon powder can have particle sizes in various ranges, including, for example, the range from smaller than 100 nanometers (nm) to microns. A hydrocarbon material 110, e.g., $CH_4$, is directed to flow into a chamber or furnace containing Si powder particles 130 at the elevated temperature to cause the hydrocarbon material 110 to decompose into carbon and hydrogen so that Si powder particles 130 are exposed to carbon and hydrogen. The elevated temperature in the chamber or furnace is set (e.g., at 1000 C) to decompose the hydrocarbon material 110 and to cause carbon coating on Si powder particles 130 but is not set sufficiently high to cause significant conversion of coated C and Si powder particles 130 into SiC occurs. This process can be controlled to occur over a sufficient long period of time (e.g., for example, about one hour) to cause C to penetrate into the Si powder and to be coated on the surfaces of the Si powder particles 130. Once the carbon coating is sufficient, the flow of $CH_4$ is terminated and an inert gas such as argon (Ar) is directed into the chamber or furnace and the temperature of the chamber or furnace is raised to a second higher elevated temperature above 1000 C, e.g., 1100 C to cause the coated carbon to react with Si of the Si powder particles 130. This conversion process can be set to be sufficiently long, e.g., three hours and this process converts the carbon coated Si into to β-SiC 140. Shown at 150 is a photograph of an example of Si powder prior to the above coating and conversion processes and at 160 is a photograph of an example of converted SiC powder.

Figure 1B:
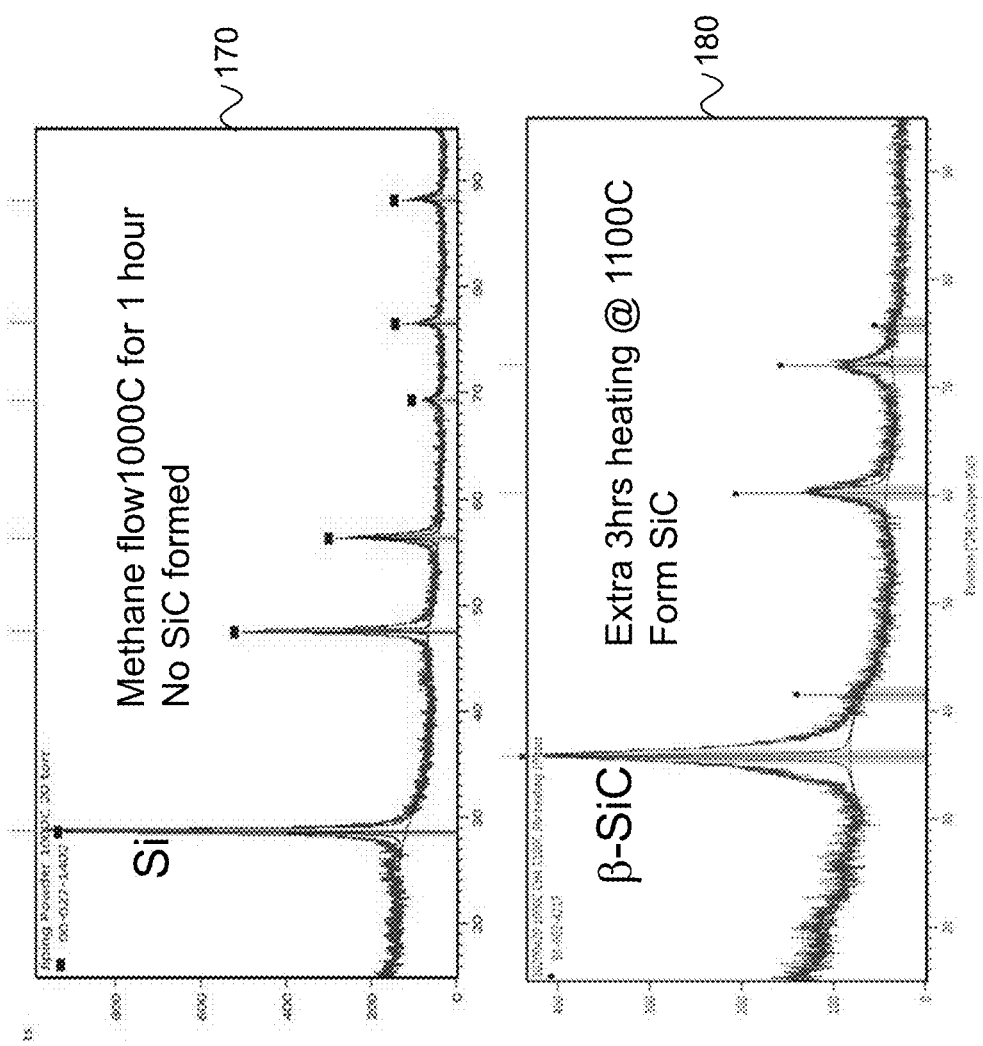
FIG. 1B depicts examples of x-ray diffraction measurements showing that after methane ($CH_4$) flow of one hour at 1000 C, elemental Si is present and no SiC is present, and after an additional three hours of heating at 1100 C, SiC is present and no elemental Si is present.

FIG. 1B depicts examples of x-ray diffraction measurements showing at 170 that after a $CH_4$ flow into Si powder for one hour at 1000 C there was only elemental Si present in the chamber but no significant SiC was detected. FIG. 1B further shows at 180 that after an additional three hours of heating at 1100 C in Ar gas after termination of the $CH_4$ flow, SiC was present in the chamber without significant presence of elemental Si in the chamber.

The above process can be implemented using various SiC structures to produce SiC based on the process in FIG. 1A. FIGS. 2A through 2D illustrate some examples.

Figure 2A:
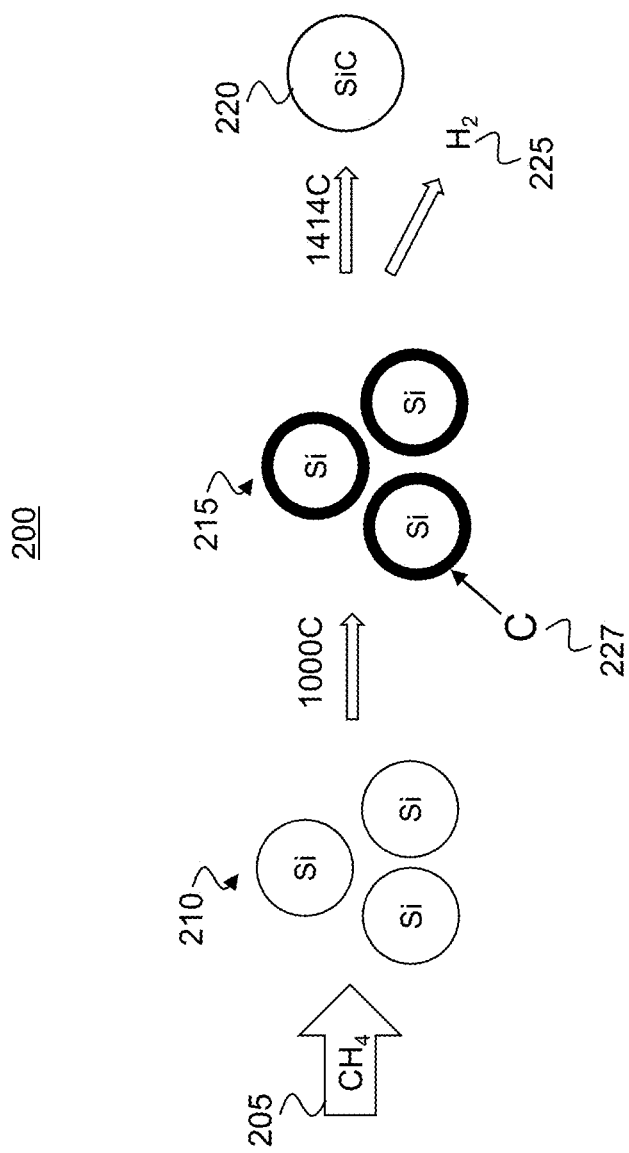
FIG. 2A depicts another process, in accordance with some example embodiments.

FIG. 2A depicts an example of a process for converting Si into SiC by using Si powder, in accordance with some example embodiments. In FIG. 2A, Si powder 210 is coated with C 227 on the Si powder surface at 1000 C from methane ($CH_4$) pyrolysis (also referred to as decomposition). Hydrogen gas ($H_2$) 225 is also produced in the $CH_4$ decomposition. The silicon powder 210 can have particle sizes smaller than 25 microns. In some implementations, silicon particles may be less than 100 nanometers (nm) in size. In some other implementations, silicon particles in the silicon and polymer slurry can be structured to have a size between 20 nanometers (nm) and 25 microns. The C coated Si 215 is then heated to the melting point of Si which is 1414 C to melt the Si. The molten Si reacts with the C coating to form SiC to produce agglomerations of SiC 220 instead of separated SiC particles. The foregoing production of SiC can be expressed in the equation:

$$Si_{(l)} + C_{(s)} \rightarrow SiC_{(s)} \qquad \text{Equation 1.}$$

Figure 2B:
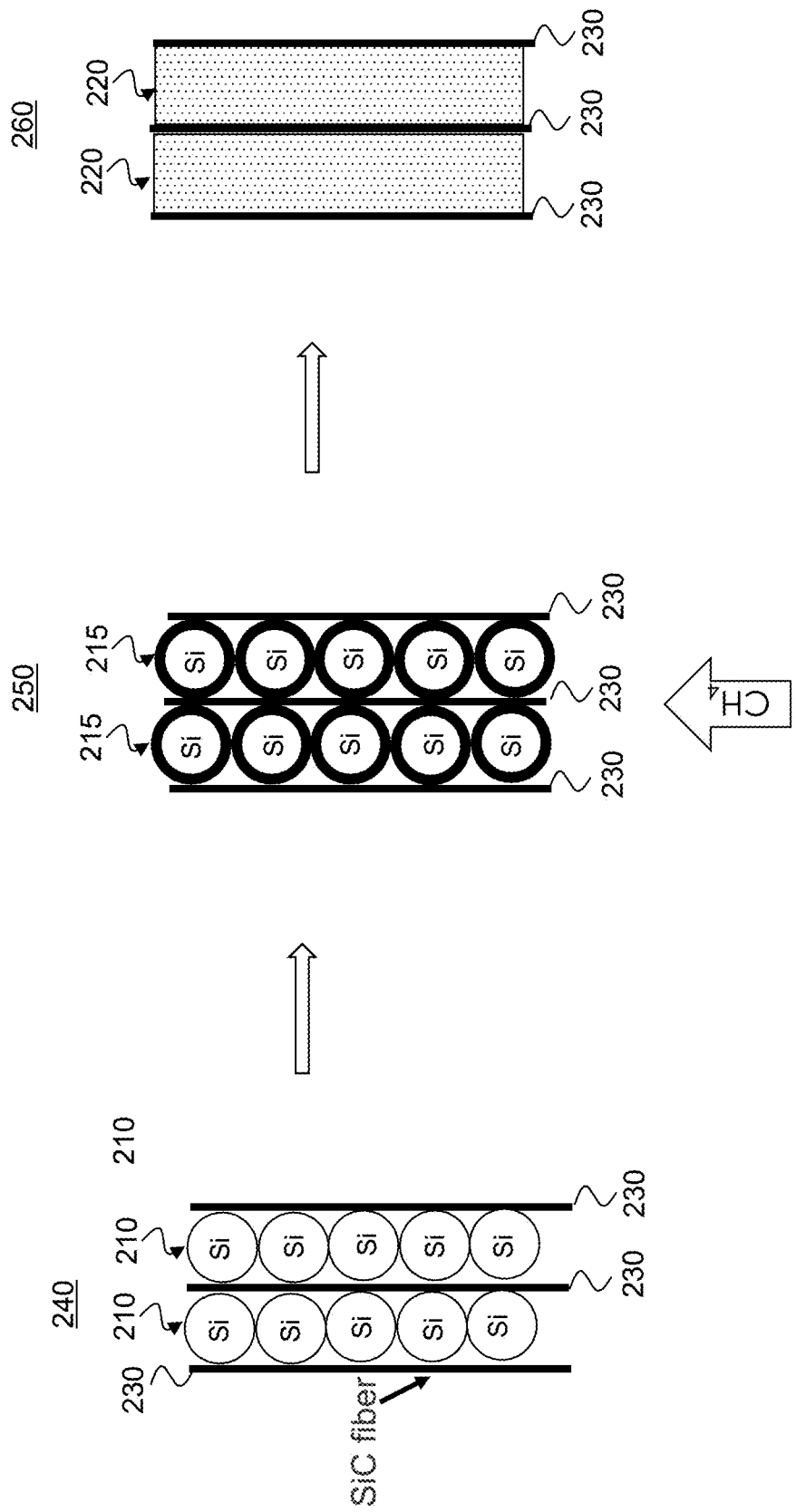
FIG. 2B depicts a process for producing a SiC composite, in accordance with some example embodiments.

FIG. 2B depicts an example of a process for producing a SiC composite by using Si powder particles 210 filled in gaps between an array, matrix or bundle of SiC fibers 230, in accordance with some example embodiments by using the process in FIG. 2A. At 240, Si powder 210 is filled in the space between SiC fibers 230 to produce a preform. SiC fibers 230 may be arranged in various configurations as a preform for the final SiC material or structure after the conversion. For example, the SiC fibers 230 may be arranged as layers of SiC fibers 230 and Si powder can be filled between layers and pressed into a mold or other structure holding a predetermined shape so that Si powder particles are in contact with SiC fibers in the furnace. At 250, the Si coating process is performed by heating the furnace to about 1000 C while directing $CH_4$ to flow through the Si powder particles and SiC fibers to decompose $CH_4$ into C and $H_2$ and to coat the surfaces of Si powder particles with C 215. The $CH_4$ flow is controlled to produce desired ratio between Si and C, e.g., a ratio of Si:C of 1:1. At 1000 C SiC is not significantly formed from the Si powder and C coating. At 260, the C coated Si and SiC fibers are heated to a higher temperature above 1000 C to cause conversion of Si and C into SiC and to consolidate the SiC particles, e.g., at 1414 C, the melting point of Si. The C coating reacts with the melted Si to produce SiC as shown by Equation 1. This conversion process is maintained for a sufficiently long period (e.g., a few hours) to convert C-coated Si powder particles between the SiC fibers into SiC and the converted SiC is fused with SiC fibers to form a SiC ceramic matrix composite (CMC).

Figure 2C:
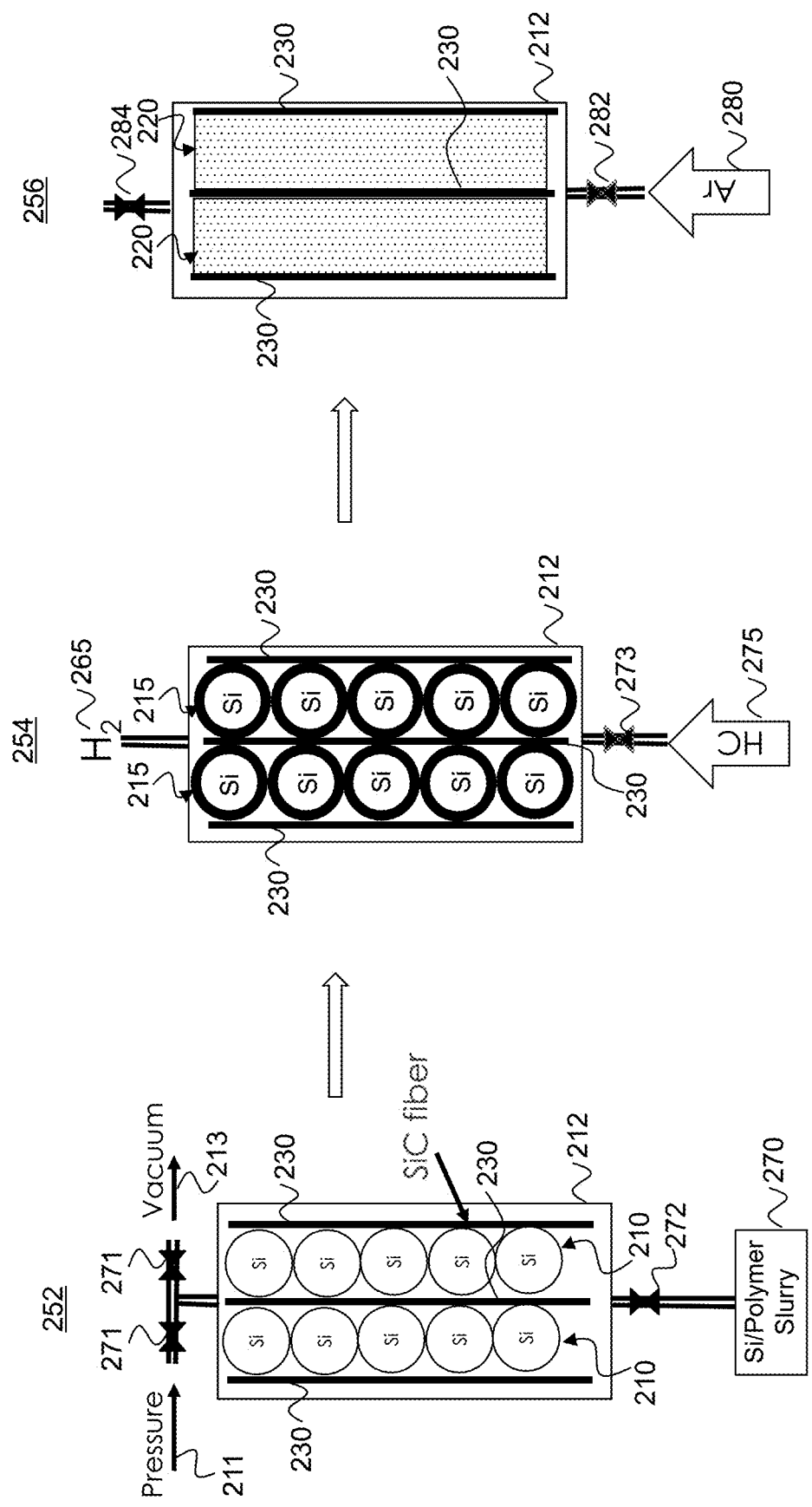
FIG. 2C depicts a process for preforming and densifying a Si/SiC composite, in accordance with some example embodiments.

FIG. 2C depicts an example process for preforming and densifying a Si/SiC composite, in accordance with some example embodiments based on the process in FIG. 1A.

At 252, a preform of silicon carbide fibers 230 and silicon powder particles 210 is formed by pumping air out of the chamber 212 by connecting vacuum 213 via valves 271 to chamber 212, then closing valves 271. Due to the evacuation of chamber 212, the Si and polymer slurry 270 are pulled into chamber 212. Examples of the polymer in the polymer slurry include: 1) QPAC 40 or Poly(propylene Carbonate) which can decompose to gases at a high temperature without producing a residue. QPAC 40 enables ease of controlling the amount of carbon coating because the carbon comes from $CH_4$ pyrolysis and not the polymer. See, for example, QPAC 40 (https://empowermaterials.com/wp-content/uploads/2014/11/QPAC-40-Technical-Data-Sheet.pdf which is incorporated by reference into this patent document). 2) PVA or Poly(vinyl alcohol) which decomposes at a high temperature producing carbon that will coat the silicon surface requiring less carbon from $CH_4$ which, in turn, reduces the processing time. Next, a pressurized inert gas 211 is directed into chamber 212 to push the Si powder and the slurry into SiC fibers and the Si/SiC is dried to produce the preform.

At 254, the chamber 212 is heated to about 1000 C to cause pyrolysis of the polymer to gas and carbon. $CH_4$ 275 or another hydrocarbon may be added by opening valve 273 that will decompose into C and $H_2$ when heated to 1000 C. The pyrolysis of the polymer and the decomposition of the hydrocarbon provide C that coats the Si particles. The hydrocarbon flow may be stopped once the Si:C ratio reaches 1:1.

At 256, the Si/SiC is densified by heating the chamber 212 to a temperature of 1414 C or higher. The preform may be further pressed together by mechanical means or by high pressure gas such as in the preforming step. The Si in the C coated Si 215 melts and reacts with the C to form SiC that attaches to the SiC fibers 230 to form a CMC.

Figure 2D:
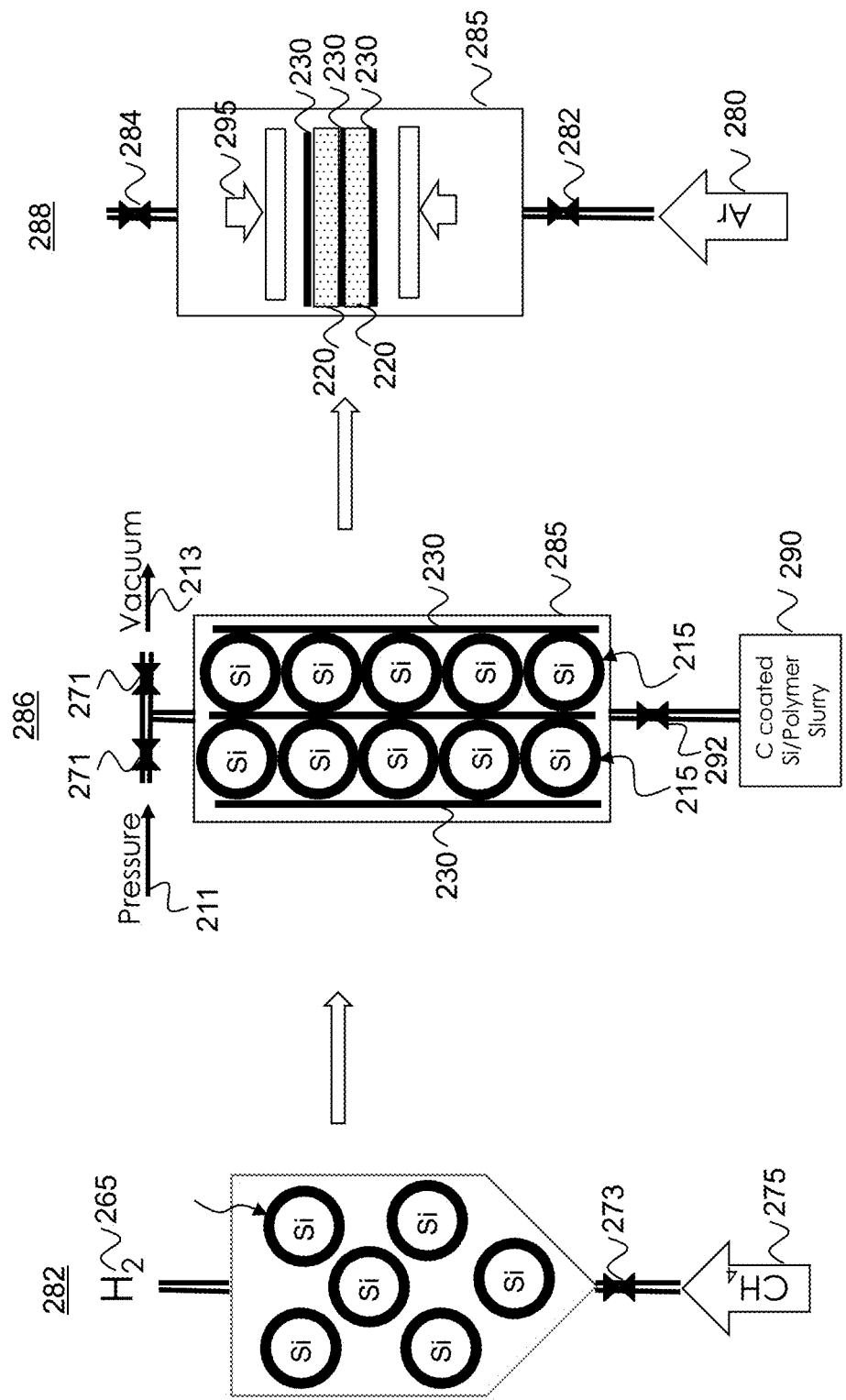
FIG. 2D depicts another process for preforming and densifying a Si/SiC composite, in accordance with some example embodiments.

FIG. 2D depicts another process for preforming and densifying a SiC composite, in accordance with some example embodiments.

At 282, the chamber 285 containing Si powder is heated to about 1000 C. $CH_4$ 275 or another hydrocarbon is added by opening valve 273. For example, $CH_4$ 275 may be added which will decompose into C and $H_2$ at a temperature of 1000 C. The decomposition of the hydrocarbon provides C that coats the Si particles to produce C coated Si particles 215. The hydrocarbon flow may be stopped once the Si:C ratio reaches 1:1. Other methods of producing C coated Si 215 can also be used.

At 286, the C coated Si powder 215 produced in 282 is added to a polymer to make slurry 290. The slurry 290 is preformed with silicon carbide fibers 230 by 1) pulling a vacuum on the chamber 285 by connecting vacuum 213 via valves 271 to chamber 285, then closing valves 271; 2) due to the evacuation of chamber 285, the slurry 290 is pulled into chamber 285; 3) connecting pressurized inert gas 211 to chamber 285 to push the Si powder and the slurry into the fibers; and 4) drying the Si/SiC composite to produce the preform.

At 288, the Si/SiC composite is densified by heating the chamber 285 to a temperature of 1414 C or higher. The preform may be further pressed together by mechanical means or by high pressure gas. The polymer in the slurry 290 will decompose to C and $H_2$. The Si in the C coated Si 215 melts and reacts with the C from the coating and from the decomposition of the polymer to form SiC that attaches to the SiC fibers 230 to form a CMC.

Figure 3:
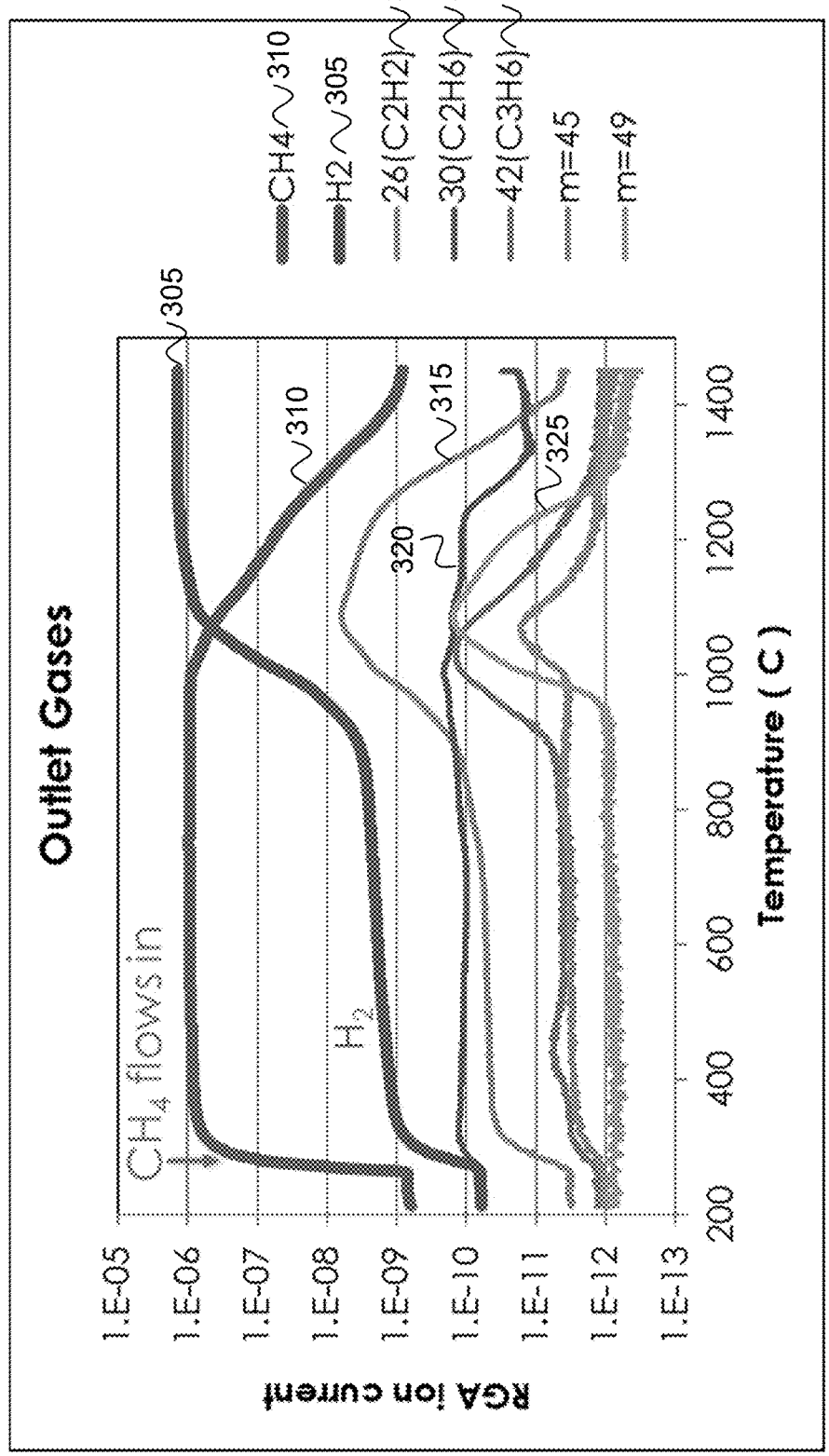
FIG. 3 depicts example plots of ion current from a residual gas analyzer as a function of temperature for various outlet gasses.

FIG. 3 depicts example plots of ion current from a residual gas analyzer as a function of temperature for various outlet gasses. FIG. 3 shows that $CH_4$ 310 cleanly decomposes above 1000 C to form carbon and hydrogen 305 and that very little methane decomposes <1000 C. Carbon preferentially coats the silicon surface which keeps the system clean including the sample surface, and keeps the chamber 212/285 clean. Methane will flow inside the sample causing a uniform carbon coating of the Si powder inside the chamber. Also shown at 300 is the low proportion of other outlet gasses including $C_2H_2$ 315, $C_2H_6$ 320, and $C_3H_6$ 325.

Using the disclosed techniques and methods, parts and components can be produced that are thicker than the maximum thickness practical using traditional chemical vapor infiltration (CVI) processing techniques. The disclosed techniques using, for example, a hydrocarbon such as $CH_4$ which is a small molecule enables $CH_4$ and thus C penetration deep inside the structures facilitating the production of thicker parts. $CH_4$ penetrates small pores which do not stop the $CH_4$ flow. Another advantage of $CH_4$ is that it only decomposes on the Si surface where the C is desired and not elsewhere. Once Silicon has a thin carbon coating, the C coating rate will be slower. Rather than adding C to an already coated Si surfaces, the $CH_4$ will decompose and thus C will be deposited on another bare silicon surface.

$CH_4$ decomposes to carbon and hydrogen. Because $H_2$ is an even smaller molecule that $CH_4$, $H_2$ has an even higher mobility than $CH_4$. As such, $H_2$ will flow out of the silicon composite part quickly and thus no pressure builds up inside the parts due to the decomposition.

Currently, the processes used for SiC CMC fabrication include chemical vapor infiltration (CVI), silicon melt infiltration (MI), polymer infiltration process (PIP). Each of the foregoing processes has disadvantages compared to the disclosed techniques. For example, CVI has a process time up to 1000 hours where the disclosed techniques require 10 hours or less. CVI can only be used to produce parts of about 1-2 mm thick where the disclosed techniques can produce parts of about 1 cm thick (or thicker). The disclosed techniques have better uniformity in the density of the produced parts than parts produced using CVI. CVI also produces HCl gas where the disclosed techniques do not. Traditional MI, where molten silicon is reacted with a carbon preform, tends to leave residual and unreacted Si even at 1414 C where the disclosed techniques enable reaction of all the Si. PIP has a lower volume density and requires many heat cycles as well as long high temperature heat treatment to avoid amorphous SiC.

One of the challenges in producing SiC composites is that the density of the finished part may be lower than what is desired due to shrinkage during conversion to SiC which limits the density of the finished part. SiC has density of 3.1 g/cc which is higher than Si which has a density of 2.35 g/cc and C which has a density of 2.4 g/cc. The increased density of the SiC product results in a shrink in the volume after SiC formation to about 76% of the volume of the component Si and C. With a typical fiber volume of 33%, the overall composite volume density will be about 84%.

The disclosed techniques enable higher density composites with densities >90%. By designing pressable parts such as being pressed by a plate when the silicon is melted results in a part that is almost 100% solid. Mixing SiC powder into the Si powder increases the initial proportion of SiC volume and increases the density of the completed part. Also, use of SiC fibers increases the density of the completed parts. Multiple cycles can be performed with Si powder having smaller Si particle sizes in the later cycles. Also, MTS CVI or polymer infiltration pyrolysis may be used in some cases after the first cycle to further densify.

Figure 4:
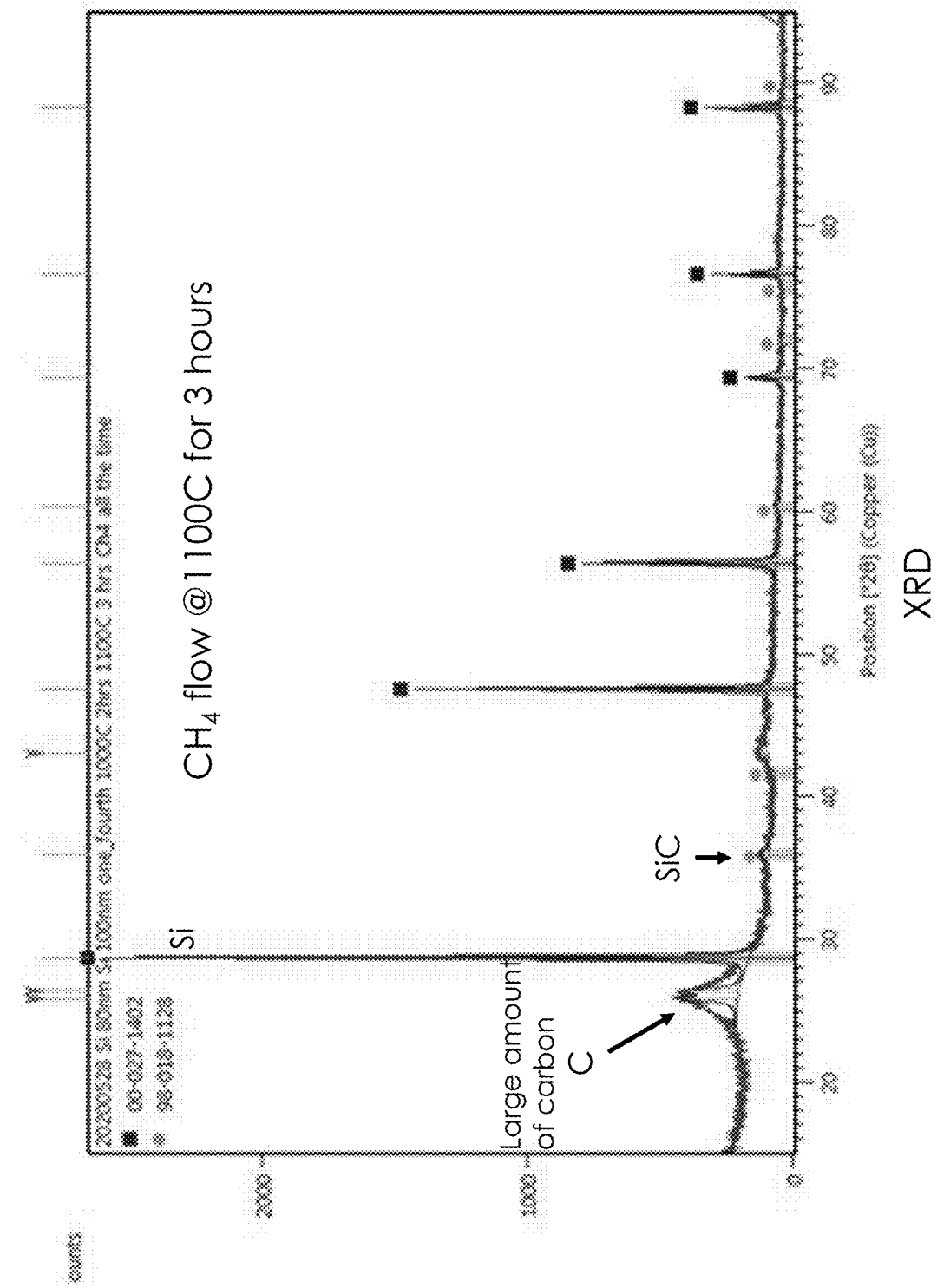
FIG. 4 depicts an example of an x-ray diffraction plot of a material showing silicon, carbon, and silicon carbide after three hours at 1100 C.

FIG. 4 depicts an example of an x-ray diffraction plot of a material showing silicon, carbon, and silicon carbide after three hours at 1100 C. In some example embodiments, Si powder may be pre-coated with C. At 1100 C, Si is quickly coated with C and no SiC forms if a hydrocarbon such as $CH_4$ is present. For example, the coating occurs with a 3 hour coating time with $CH_4$ using a C:Si mass ratio of 2:1 (or a mole ratio of 5:1). In some example embodiments, after 30 minutes a Si:C ratio of 1:1 can be achieved. The pre-coated Si can then be used in various processes and converted to SiC. For example, the carbon coated powder can be filled into a preform. By then heating to 1414 C or higher temperature, the Si will melt and convert to SiC or a CMC. No other gas is needed. The foregoing process is particularly good for pressable parts.

Because the disclosed techniques and processes produce no corrosive gases such as MTS gas and/or HCl as byproducts, the disclosed techniques can be used to produce other carbide composites using fibers such as metal or ceramic fibers with SiC as a matrix. The techniques may be used for other carbide matrix materials when appropriate reaction conditions are met between the metal and carbon. For example, instead of using silicon particles, zirconium metal powder may be used to form a zirconium carbide matrix.

Figure 5:
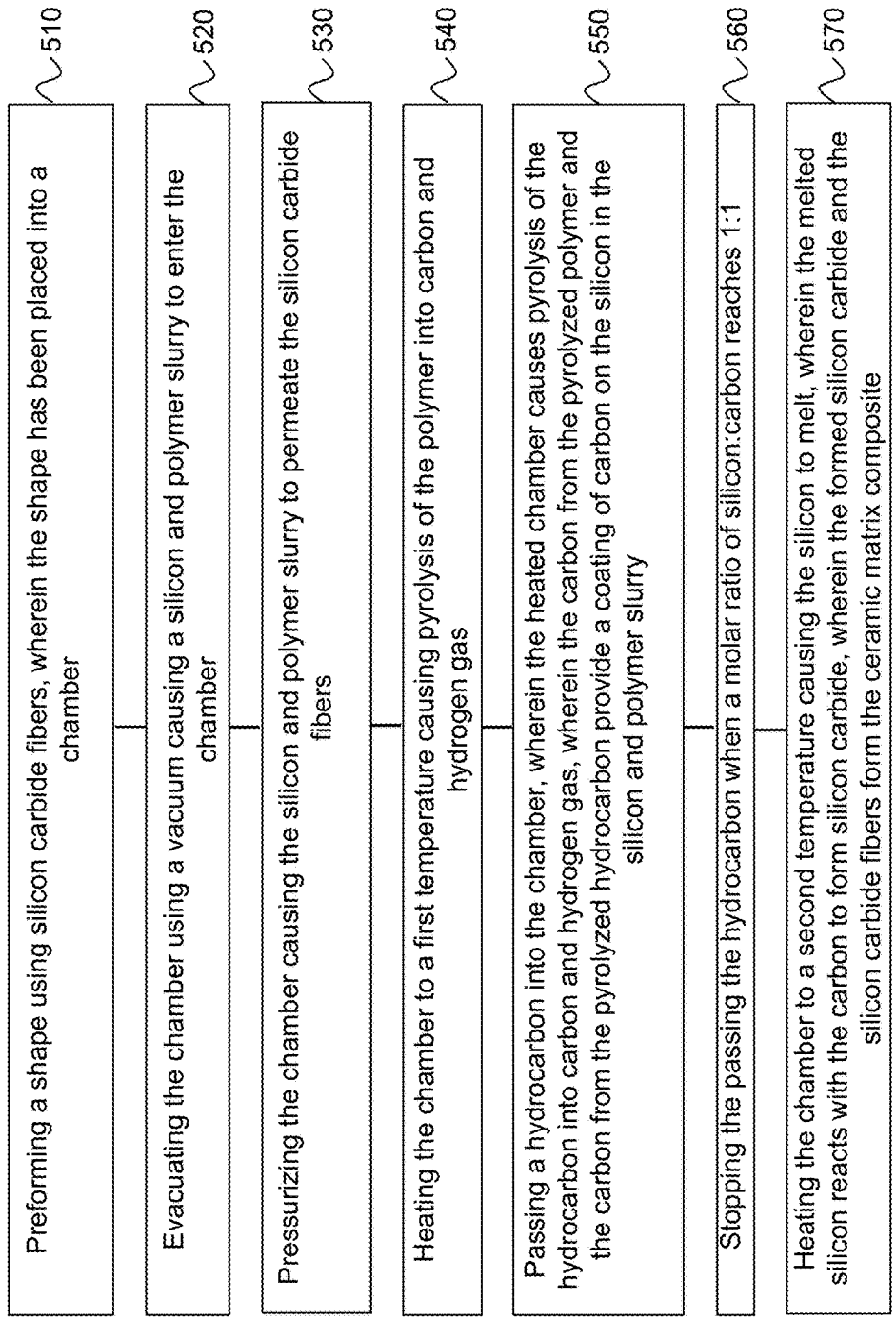
FIG. 5 depicts a process for producing a ceramic matrix composite, in accordance with some example embodiments.

FIG. 5 depicts a method of producing a ceramic matrix composite, in accordance with some example embodiments. At 510, the method includes preforming a shape using silicon carbide fibers. For example, the shape may be of a mechanical or structural part for a system or device. The preformed part is placed into a chamber. At 520, the method includes evacuating the chamber using a vacuum. By removing pressure from the chamber, a slurry including silicon and a polymer is caused to enter the chamber. At 530, the method includes pressurizing the chamber which causes the silicon and polymer slurry to permeate the silicon carbide fibers. At 540, the method includes heating the chamber to a first temperature causing pyrolysis of the polymer into carbon and hydrogen gas. For example, the first temperature may be about 1000 C. At 550, the method includes passing a hydrocarbon into the chamber. The heated chamber causes pyrolysis of the hydrocarbon into carbon and hydrogen gas. The carbon from the pyrolyzed polymer and the carbon from the pyrolyzed hydrocarbon coat the silicon from the slurry with a layer of carbon. At 560, the method includes stopping the passing the hydrocarbon when a molar ratio of silicon to carbon reaches 1:1. At 570, the method includes heating the chamber to a second temperature causing the silicon to melt. For example, the second temperature may be about 1414 C, the melting point of silicon. The melted silicon reacts with the carbon to form silicon carbide, and the formed silicon carbide and the silicon carbide fibers form the ceramic matrix composite.

Figure 6:
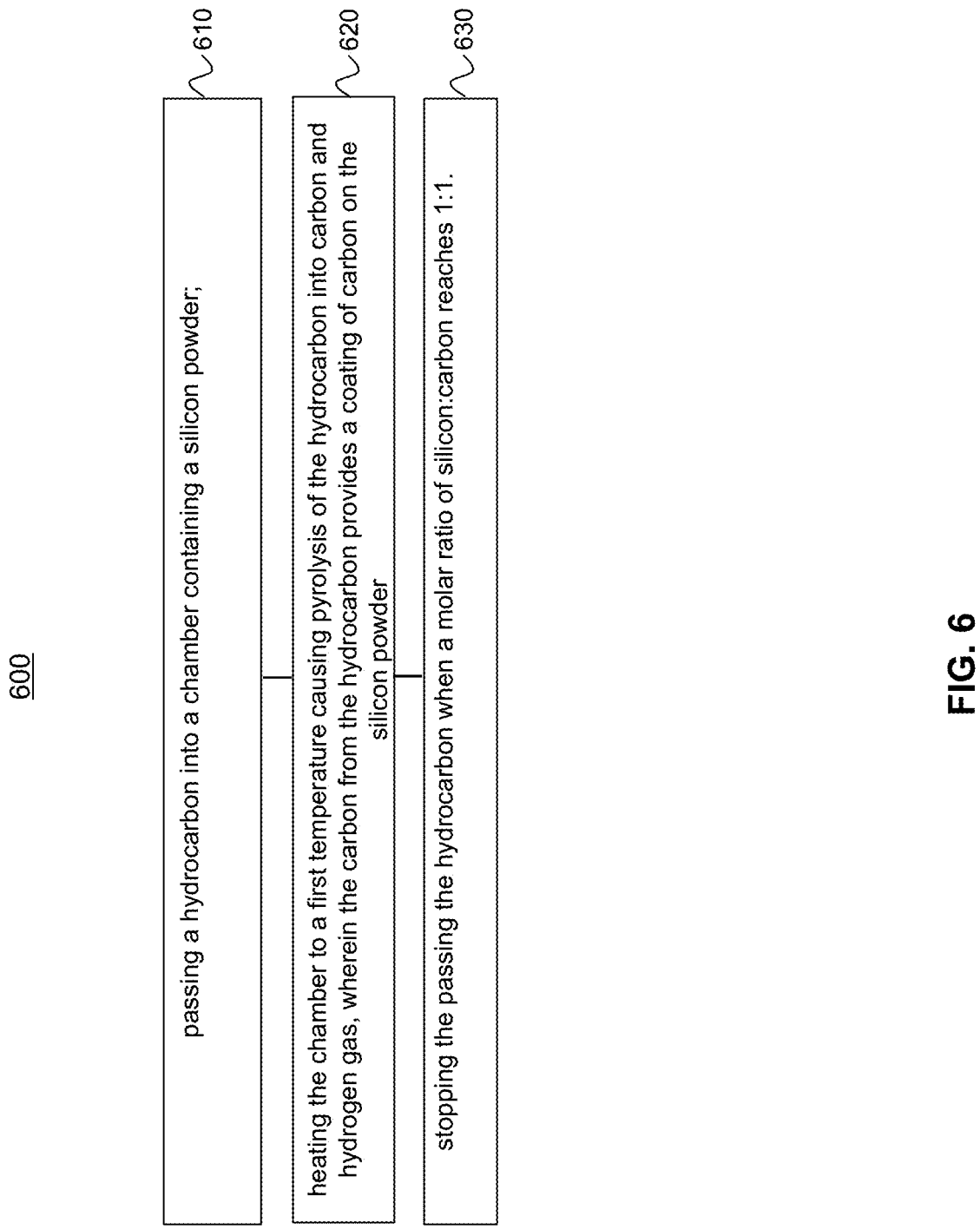
FIG. 6 depicts a process for producing carbon coated silicon particles, in accordance with some example embodiments.

FIG. 6 depicts a method of producing carbon coated silicon particles, in accordance with some example embodiments. At 610, the method includes passing a hydrocarbon into a chamber containing a silicon powder. At 620, the method includes heating the chamber to a first temperature causing pyrolysis of the hydrocarbon into carbon and hydrogen gas, wherein the carbon from the hydrocarbon provides a coating of carbon on the silicon powder. At 630, the method includes stopping the passing the hydrocarbon when a molar ratio of silicon:carbon reaches 1:1.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described, and other implementations enhancements and variations can be made based on what is described and illustrated in this patent document.

What is claimed is:

1. A method of producing a silicon carbide (SiC) ceramic matrix composite, comprising:
    placing a silicon carbide preform in a chamber;
    evacuating the chamber using a vacuum to introduce a slurry mix of silicon particles and a polymer in the chamber to contact the silicon carbide preform;
    pressurizing the chamber causing the silicon particles and polymer slurry to permeate between silicon carbide fibers of the silicon carbide preform;
    heating the chamber to a first temperature causing pyrolysis of the polymer into carbon and hydrogen gas to densify silicon particles between the silicon carbide fibers of the silicon carbide preform;
    passing a hydrocarbon into the chamber, wherein the heated chamber causes pyrolysis of the hydrocarbon into carbon and hydrogen gas and causes the carbon from the pyrolyzed polymer and the carbon from the pyrolyzed hydrocarbon to be coated on the silicon particles between the silicon carbide fibers of the silicon carbide preform;
    stopping the passing the hydrocarbon when a molar ratio of silicon to carbon in the silicon carbide preform reaches approximately 1; and
    heating the chamber to a second temperature causing the silicon particles to melt and to react with the carbon to form silicon carbide to cause the formed silicon carbide and the silicon carbide fibers to form the SiC ceramic matrix composite,
    wherein the second temperature is higher than the first temperature.

2. The method of claim 1, wherein the first temperature is about 1000 C.

3. The method of claim 1, wherein the second temperature is about 1414 C.

4. The method of claim 1, comprising:
    using silicon particles in the silicon and polymer slurry with a particle size between 20 nanometers (nm) and 25 microns.

5. The method of claim 1, wherein the heating the chamber to the second temperature causes a reaction between the melted silicon and carbon that is expressed as:

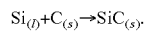

$$Si_{(l)} + C_{(s)} \rightarrow SiC_{(s)}.$$

6. The method of claim 1, further comprising:
    passing, after stopping the passing the hydrocarbon, an argon gas into the chamber.

7. The method of claim 1, wherein the hydrocarbon comprises methane ($CH_4$).

8. The method of claim 1, wherein the hydrocarbon comprises:
    diesel, gasoline, JP8, kerosene, natural gas, propane, ethane, butane, or another hydrocarbon gas.

9. The method of claim 1, further comprising providing an inert gas to the chamber while heating the chamber to the second temperature.

10. The method of claim 1, wherein the second temperature is about 1100C or above.

11. The method of claim 1, further comprising:
    maintaining the first temperature in the chamber to allow the pyrolysis and densification of the silicon particles between the silicon carbide fibers of the silicon carbide preform to proceed for about one hour.

12. The method of claim 1, further comprising:
    maintaining the second temperature in the chamber to allow the formation of the SiC ceramic matrix composite to proceed for about three hours.

13. The method of claim 1, wherein the SiC ceramic matrix is (a) without excess elemental silicon or carbon or (b) with trace quantities of silicon and carbon.

14. The method of claim 1, wherein the SiC ceramic matrix is of a high, uniform density of at least 90% or with a thickness of up to 1 centimeter.

15. A method, comprising:
    passing a hydrocarbon into a chamber containing silicon particles;
    heating the chamber to a first temperature causing pyrolysis of the hydrocarbon into carbon and hydrogen gas, wherein the carbon from the hydrocarbon provides a coating of carbon on the silicon particles to produce carbon coated silicon particles; and
    stopping the passing the hydrocarbon when a molar ratio of silicon to carbon in the carbon coated silicon particles is approximately 1;
    infiltrating the carbon coated silicon particles into silicon carbide fiber to form a silicon carbide preform; and
    heating the preform to a second temperature causing the silicon within the carbon coated silicon particles to melt, wherein the melted silicon reacts with the carbon to form silicon carbide such that the formed silicon carbide and the silicon carbide fibers form a silicon carbide (SiC) ceramic matrix composite.

16. The method of claim 15, wherein infiltrating the carbon coated silicon particles into the silicon carbide fiber comprises:

preparing a slurry comprising the carbon coated silicon particles and a polymer; and pressurizing the chamber causing the slurry to permeate the silicon carbide fibers to produce the silicon carbide preform.

17. The method of claim 16, further comprising:

arranging, before the pressurizing, the silicon carbide fibers into a preformed shape, wherein the shape has been placed into the chamber.

18. The method of claim 15, wherein the first temperature is lower than the second temperature.

19. The method of claim 15, wherein the second temperature is about 1414C or above.

20. The method of claim 15, wherein the hydrocarbon comprises methane ($CH_4$).

21. The method of claim 15, wherein the hydrocarbon is diesel, gasoline, JP8, kerosene, natural gas, propane, ethane, butane, or another hydrocarbon gas.

22. The method of claim 15, further comprising:

maintaining the first temperature in the chamber to allow the pyrolysis and the production of the carbon coated silicon particles to proceed for about one hour.

23. The method of claim 15, wherein the SiC ceramic matrix composite has a high, uniform density of at least 90% without excess elemental silicon or carbon.

* * * * *